United States Patent
Yamada et al.

(10) Patent No.: US 9,217,385 B2
(45) Date of Patent: Dec. 22, 2015

(54) FUEL INJECTION CONTROL APPARATUS FOR INTERNAL COMBUSTION ENGINE AND METHOD FOR CONTROLLING INTERNAL COMBUSTION ENGINE

(75) Inventors: Haruhiko Yamada, Wako (JP); Masaaki Nagashima, Wako (JP); Kan Nakaune, Wako (JP); Tatsuhito Esaki, Wako (JP); Nobuaki Ito, Wako (JP); Kentaro Miki, Wako (JP); Yutaka Sugahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 13/358,518

(22) Filed: Jan. 26, 2012

(65) Prior Publication Data
US 2012/0197511 A1 Aug. 2, 2012

(30) Foreign Application Priority Data
Jan. 31, 2011 (JP) ................................. 2011-017995

(51) Int. Cl.
F02D 41/06 (2006.01)
F02D 41/02 (2006.01)
F02D 41/30 (2006.01)

(52) U.S. Cl.
CPC .......... *F02D 41/0255* (2013.01); *F02D 41/068* (2013.01); *F02D 41/3011* (2013.01); *F02D 2200/021* (2013.01); *Y02T 10/26* (2013.01)

(58) Field of Classification Search
CPC ....... F02D 41/40–41/405; F02D 43/00–45/00; F02D 41/0255
USPC .................. 123/299, 300, 304, 480, 486, 491
See application file for complete search history.

(56) References Cited

U.S. PATENT DOCUMENTS

| 6,044,642 A | * | 4/2000 | Nishimura et al. | ............. 60/285 |
| RE36,737 E | * | 6/2000 | Brehob et al. | ................ 123/299 |
| 6,244,241 B1 | * | 6/2001 | Mamiya et al. | ............... 123/295 |
| 6,401,703 B1 | * | 6/2002 | Mamiya et al. | ............... 123/674 |
| 6,449,946 B2 | * | 9/2002 | Kuji et al. | ........................ 60/286 |

(Continued)

FOREIGN PATENT DOCUMENTS

| JP | 3758003 B2 | 3/1999 |
| JP | 2000-073820 | 3/2000 |
| JP | 2000-104609 | 4/2000 |

OTHER PUBLICATIONS

Japanese Office Action for corresponding JP Application No. 2011-017995, Jan. 21, 2013.

*Primary Examiner* — Hung Q Nguyen
*Assistant Examiner* — Josh Campbell
(74) *Attorney, Agent, or Firm* — Mori & Ward, LLP (57) ABSTRACT

A fuel injection control apparatus includes a first injection controller, a second injection controller, and a selector. The first injection controller is configured to perform a first injection operation in an intake stroke and is configured to perform a second injection operation in a compression stroke. The second injection controller is configured to perform both the first injection operation and the second injection operation in the intake stroke. The selector is configured to select fuel injection performed by the first injection controller when an internal combustion engine is in a warm-up operating state and is configured to select fuel injection performed by the second injection controller when the internal combustion engine is not in the warm-up operating state.

4 Claims, 4 Drawing Sheets

(56) References Cited

U.S. PATENT DOCUMENTS

| | | | |
|---|---|---|---|
| 6,513,320 B1* | 2/2003 | Nishimura et al. | 60/285 |
| 6,557,532 B1* | 5/2003 | Nakayama et al. | 123/490 |
| 7,051,701 B2* | 5/2006 | Tomita | 123/299 |
| 7,373,928 B2* | 5/2008 | Thomas | 123/491 |
| 7,866,303 B2* | 1/2011 | Storhok et al. | 123/491 |
| 2005/0274353 A1* | 12/2005 | Okubo et al. | 123/299 |
| 2006/0043620 A1* | 3/2006 | Roth et al. | 261/52 |
| 2008/0196695 A1* | 8/2008 | Storhok et al. | 123/478 |
| 2008/0208438 A1* | 8/2008 | Sukegawa et al. | 701/105 |

\* cited by examiner

FUEL INJECTION CONTROL APPARATUS FOR INTERNAL COMBUSTION ENGINE AND METHOD FOR CONTROLLING INTERNAL COMBUSTION ENGINE

CROSS-REFERENCE TO RELATED APPLICATIONS

The present application claims priority under 35 U.S.C. §119 to Japanese Patent Application No. 2011-017995, filed Jan. 31, 2011, entitled "Fuel Injection Control Apparatus for Internal Combustion Engine." The contents of this application are incorporated herein by reference in their entirety.

BACKGROUND OF THE INVENTION

1. Field of the Invention

The present invention relates to a fuel injection control apparatus for an internal combustion engine, and a method for controlling an internal combustion engine.

2. Discussion of the Background

As a fuel injection control apparatus for an internal combustion engine of the related art, the control apparatus disclosed in Japanese Patent No. 3758003 is known. The internal combustion engine disclosed in this publication is a so-called gasoline direct injection engine in which fuel is directly injected into a combustion chamber via a fuel injection valve. The fuel injection control apparatus includes a cooling water temperature sensor, a crank angle sensor, etc. and calculates the engine speed NE on the basis of an output signal from the crank angle sensor.

In this fuel injection control apparatus, as shown in FIG. 2 (steps S14 to S22) and described in paragraphs [0018] to [0028] of Japanese Patent No. 3758003, when the cooling water temperature TW is lower than a predetermined temperature TW0, i.e., when a warm-up operation is being performed, fuel injection is controlled as follows. The amount of fuel to be injected in the intake stroke is first calculated. Then, after a fuel division ratio Y is set in accordance with the cooling water temperature TW, the injection interval Int is set. Then, the injection completion timing is set in accordance with the engine speed NE. Then, in step S24, fuel is injected twice during the intake stroke, on the basis of the amount of fuel, the fuel division ratio Y, the injection interval Int, and the injection completion timing. The reason why fuel injection is performed twice is described in paragraphs [0022] and [0023] of Japanese Patent No. 3758003. That is, if fuel injection is performed only once in the intake stroke during the warm-up operation, the fuel injection time becomes longer, which increases the amount by which fuel penetrates into the combustion chamber and causes fuel to adhere to the wall of the combustion chamber. Because of this, the atomization degree is lowered, thereby facilitating the generation of smoke. As described in paragraph [0031] of Japanese Patent No. 3758003, if the cooling water temperature TW is equal to or higher than the predetermined temperature TW0, i.e., if the warm-up operation is not performed, regular fuel injection control is performed in step S26, and fuel is injected only once during the intake stroke.

SUMMARY OF THE INVENTION

According to one aspect of the present invention, a fuel injection control apparatus is for an internal combustion engine in which an exhaust gas in an exhaust passage is purged by using a catalyst. The fuel injection control apparatus includes a first injection controller, a second injection controller, and a selector. The first injection controller is configured to perform a first injection operation in an intake stroke and is configured to perform a second injection operation in a compression stroke. Fuel injection into a cylinder is performed by the first injection operation and the second injection operation separately during one combustion cycle in the internal combustion engine. The first injection operation is followed by the second injection operation. The second injection controller is configured to perform both the first injection operation and the second injection operation in the intake stroke. The selector is configured to select fuel injection performed by the first injection controller when the internal combustion engine is in a warm-up operating state and is configured to select fuel injection performed by the second injection controller when the internal combustion engine is not in the warm-up operating state.

According to another aspect of the present invention, a method is for controlling an internal combustion engine in which an exhaust gas in an exhaust passage is purged by using a catalyst, the method including: performing a first injection operation in an intake stroke and performing a second injection operation in a compression stroke by a first injection controller, fuel injection into a cylinder being performed by the first injection operation and the second injection operation separately during one combustion cycle in the internal combustion engine, the first injection operation being followed by the second injection operation; performing both the first injection operation and the second injection operation in the intake stroke by a second injection controller; selecting fuel injection performed by the first injection controller when the internal combustion engine is in a warm-up operating state; and selecting fuel injection performed by the second injection controller when the internal combustion engine is not in the warm-up operating state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
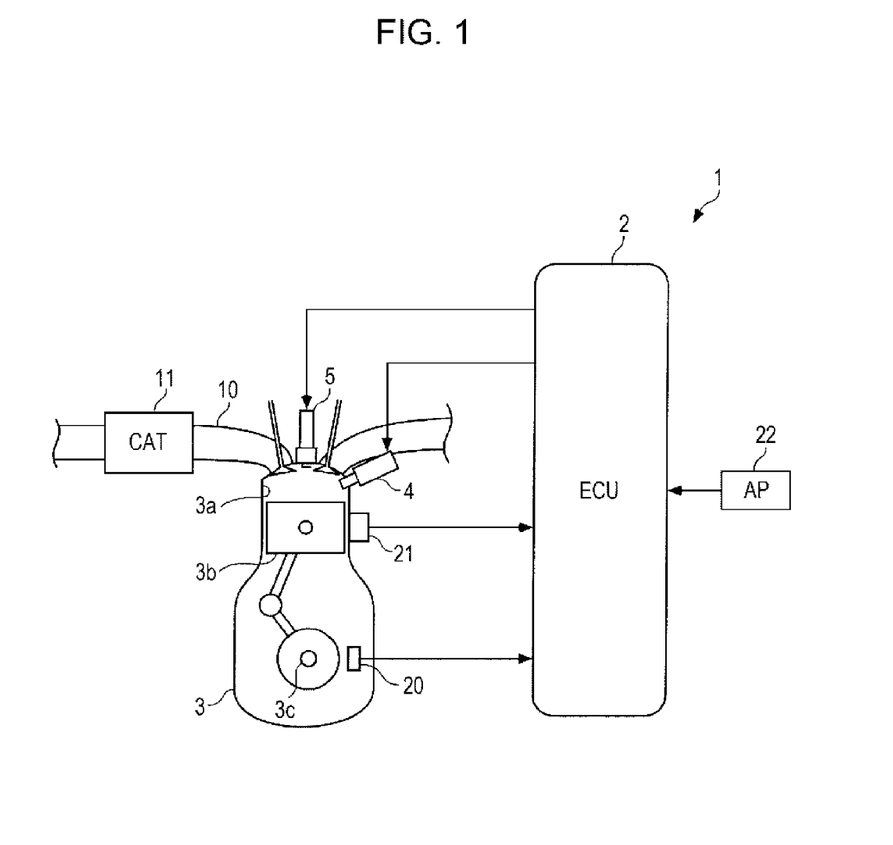
FIG. 1 schematically illustrates, together with an internal combustion engine, a fuel injection control apparatus according to an embodiment of the present invention.

A fuel injection control apparatus 1 for an internal combustion engine 3 according to an embodiment of the present invention will be described below with reference to the accompanying drawings. The fuel injection control apparatus 1 includes, as shown in FIG. 1, an engine control unit (ECU) 2. The ECU 2 performs various control operations, such as fuel injection control, in accordance with the operating state of the internal combustion engine (hereinafter simply referred to as the "engine") 3, details of which will be given later.

The engine 3 is, for example, an inline-four gasoline engine installed in a vehicle (not shown) and includes four sets of cylinders 3a and pistons 3b (only one set is shown), and a crankshaft 3c. A fuel injection valve 4 and a spark plug 5 are attached to a cylinder head of the engine 3 for each cylinder 3a such that they face a combustion chamber. During the operation of the engine 3, fuel is directly injected into the combustion chamber by using the fuel injection valve 4. That is, the engine 3 is constituted as a cylinder injection engine.

The fuel injection valve 4 is connected to the ECU 2, and the ECU 2 controls the fuel injection time for which the fuel injection valve 4 is open, and also controls the injection timing at which the fuel injection valve 4 is opened and closed. Controlling of the fuel injection time and the fuel injection timing will be discussed later. The fuel injection time of the fuel injection valve 4 corresponds to the amount of fuel to be injected to the cylinders 3a, i.e., the fuel injection amount. Accordingly, the fuel injection time of the fuel injection valve 4 is hereinafter referred to as the "fuel injection amount".

The spark plug 5 is also connected to the ECU 2, and a high voltage is applied from the ECU 2 to the spark plug 5 in accordance with the spark timing so as to generate an electric spark, thereby causing combustion of an air-fuel mixture in the combustion chamber.

A crank angle sensor 20 is provided in the engine 3. The crank angle sensor 20 is constituted of a magnet rotor and an MRE pickup, and outputs a CRK signal and a TDC signal, which are pulse signals, to the ECU 2 in accordance with the rotation of the crankshaft 3c. One pulse of the CRK signal is output at every predetermined crank angle (e.g., one degree). The ECU 2 calculates the rotation speed of the engine 3 (hereinafter referred to as the "engine speed") NE on the basis of the CRK signal. The TDC signal is a signal indicating that the piston 3b of a corresponding cylinder 3a is positioned at a predetermined crank angle which is slightly before the TDC position in the intake stroke. One pulse of the TDC signal is output at every predetermined crank angle.

A water temperature sensor 21, which is formed of a thermistor, is attached to the body of the engine 3. The water temperature sensor 21 detects the engine water temperature TW, which is the temperature of cooling water circulating within the cylinder block of the engine 3, and outputs a detection signal representing the engine water temperature TW to the ECU 2. In this embodiment, the water temperature sensor 21 corresponds to an engine temperature detector, and the engine water temperature TW corresponds to an engine temperature.

An accelerator opening sensor 22 is connected to the ECU 2, and detects the position of an accelerator pedal (not shown) (i.e., the amount by which the accelerator pedal is depressed) of a vehicle (hereinafter referred to as the "accelerator opening") AP, and outputs a detection signal representing the accelerator opening AP to the ECU 2.

A catalyst 11, which is a three-way catalyst, for purging an exhaust gas is provided in an exhaust passage 10. The catalyst 11 is activated if the temperature of the catalyst 11 is higher than a predetermined activation temperature, and converts toxic unburned components in the exhaust gas into non-toxic components.

The ECU 2 is constituted of a microcomputer including a central processing unit (CPU), a random access memory (RAM), a read only memory (ROM), an input/output (I/O) interface (none of which are shown), etc. The ECU 2 determines the operating state of the engine 3 from the detection signals of the above-described sensors 20 through 22, and also performs various control operations, such as fuel injection control processing in accordance with the operating state of the engine 3. In this embodiment, the ECU 2 corresponds to a first injection controller, a second injection controller, and a selector.

Figure 2:
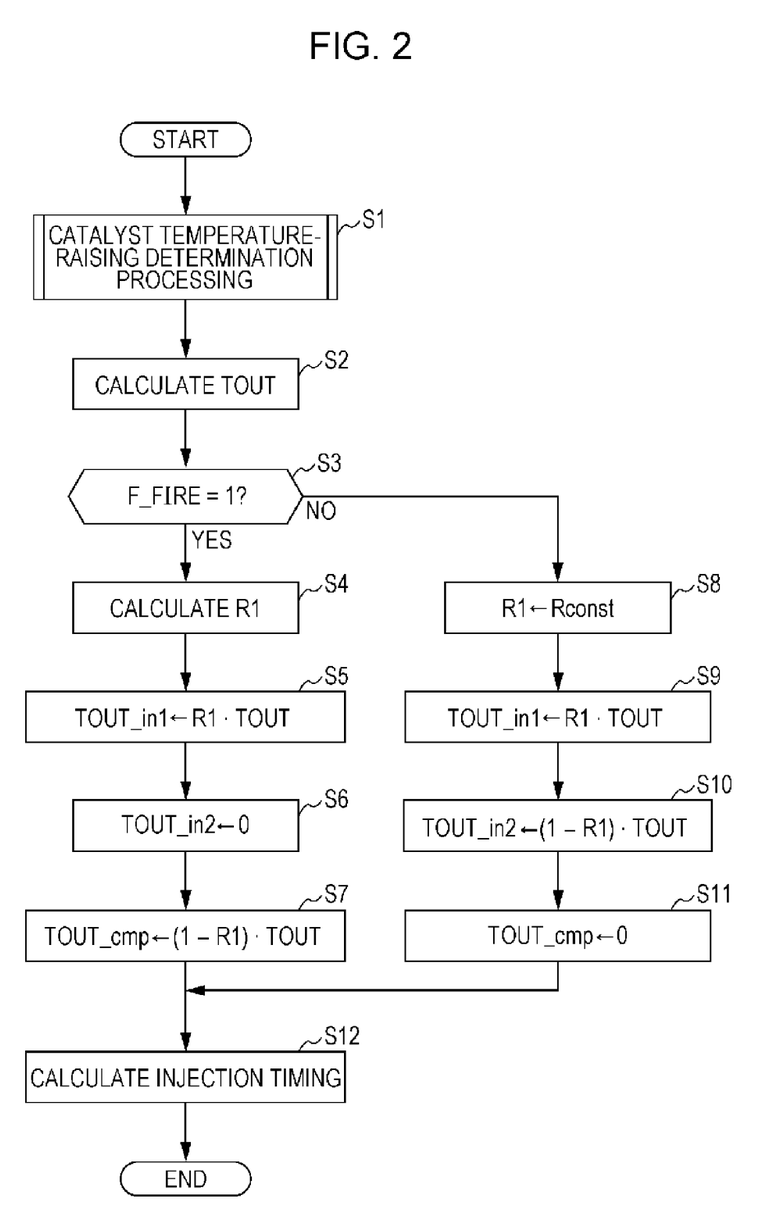
FIG. 2 is a flowchart illustrating fuel injection control processing.

A description will now be given, with reference to FIG. 2, of fuel injection control processing of this embodiment. This fuel injection control processing is performed in order to calculate the fuel injection amount and the fuel injection timing, as described below, and is performed in synchronization with the timing at which the TDC signal is generated.

Figure 3:
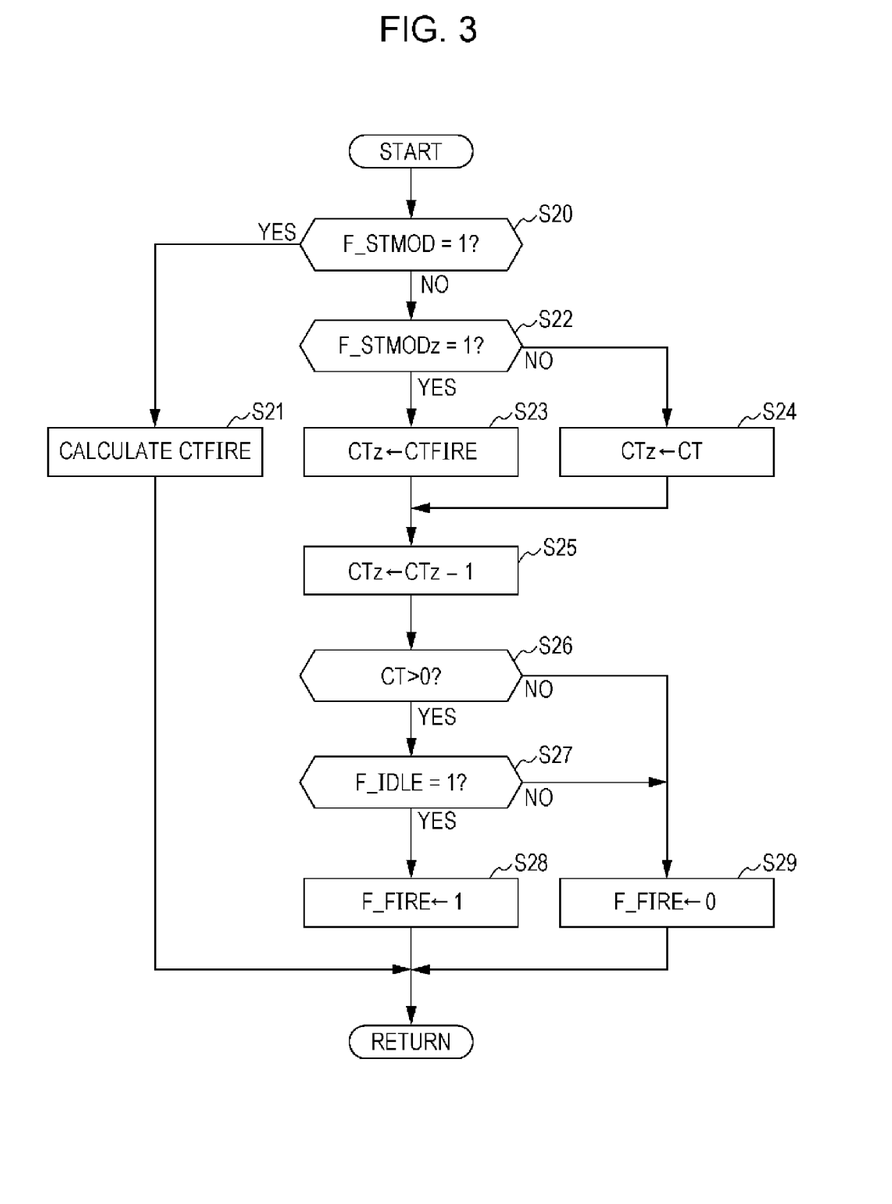
FIG. 3 is a flowchart illustrating catalyst temperature-raising determination processing.

In this processing, in step S1 (shown as "S1" in FIG. 2, and the other step numbers being expressed in the same way), catalyst temperature-raising determination processing is performed. This determination processing is performed in order to determine whether to execute catalyst temperature-raising control processing (control processing for speedily activating the catalyst 11), which will be discussed later, and more specifically, it is executed as shown in FIG. 3. As shown in FIG. 3, it is first determined in step S20 whether the start mode flag F_STMOD is set to be "1".

The start mode flag F_STMOD is set to be "1" in determination processing (not shown) until the cranking of the engine 3 finishes, and is set to be "0" when cranking finishes so that the engine 3 is in the complete explosion state.

If the result of step S20 is YES, it means that the engine 3 is in the cranking state. Thus, the process proceeds to step S21 in which the catalyst temperature-raising value CTFIRE is calculated in accordance with the engine water temperature TW by searching a map (not shown). The processing is then completed. In this map, the catalyst temperature-raising value CTFIRE is set to be 0 in a range in which the engine water temperature TW is equal to or higher than a predetermined temperature after a warm-up operation has finished (hereinafter referred to as the "predetermined warm-up temperature"). This is because it is not necessary to perform catalyst temperature-raising control processing in the region in which the engine water temperature TW is equal to or higher than the predetermined warm-up temperature. In contrast, in the region in which the engine water temperature TW is lower than the predetermined warm-up temperature, as the engine water temperature TW becomes lower, the catalyst temperature-raising value CTFIRE is set to be greater. This is because it takes longer to activate the catalyst as the engine water temperature TW becomes lower, i.e., as the catalyst temperature becomes lower.

If the result of step S20 is NO, it means that the engine 3 has already started. Thus, the process proceeds to step S22 to determine whether the previous value F_STMDz of the start mode flag is set to be "1". If the result of step S22 is YES, it means that the current control processing is to be performed immediately after the engine 3 has started. The process then proceeds to step S23 in which the catalyst temperature-raising value CTFIRE is set as the previous value CTz of a catalyst temperature-raising control counter.

If the result of step S22 is NO, the process proceeds to step S24 in which the count value CT of the catalyst temperature-raising control counter stored in the RAM is set as the previous value CTz of the catalyst temperature-raising control counter. Then, in step S25 after step S23 or S24, the value CTz-1 obtained by subtracting one from the previous value CTz is set as the count value CT of the catalyst temperature-raising control counter. That is, the count value CT of the catalyst temperature-raising control counter is decremented by one.

Then, the process proceeds to step S26 to determine whether the count value CT of the catalyst temperature-raising control counter is greater than 0. If the result of step S26 is YES, the process proceeds to step S27 to determine whether the idling operation flag F_IDLE is "1". In determination processing (not shown), the idling operation flag F_IDLE is set to be "1" when idling operation conditions are satisfied, and is set to be "0" when idling operation conditions are not satisfied.

If the result of step S27 is YES, it means that the idling operation conditions are satisfied, and it is determined that catalyst temperature-raising control processing is to be executed. Thus, the process proceeds to step S28 in which the catalyst temperature-raising control flag F_FIRE is set to be "1". The processing is then completed.

In contrast, if the result of step S26 or S27 is NO, i.e., if CT is equal to or smaller than 0, or if the idling operation conditions are not satisfied, it is determined that catalyst temperature-raising control processing is not to be executed. Thus, the process proceeds to step S29 in which the catalyst temperature-raising control flag F_FIRE is set to be "0". The processing is then completed.

Referring back to FIG. 2, the catalyst temperature-raising determination processing in step S1 has been performed as described above. Then, the process proceeds to step S2 in which the total fuel injection amount TOUT is calculated. To calculate the total fuel injection amount TOUT, the required torque PMCMD is first calculated in accordance with the engine speed NE and the accelerator opening AP by searching a map (not shown), and then, the total fuel injection amount TOUT is calculated in accordance with the required torque PMCMD and the engine speed NE by searching a map (not shown).

Then, the process proceeds to step S3 to determine whether the above-described catalyst temperature-raising control flag F_FIRE is "1". If the result of step S3 is YES, it means that the catalyst temperature-raising control processing is being executed. Then, the process proceeds to step S4 in which the intake division ratio R1 is calculated in accordance with the engine water temperature TW by searching the map shown in FIG. 4.

Figure 4:
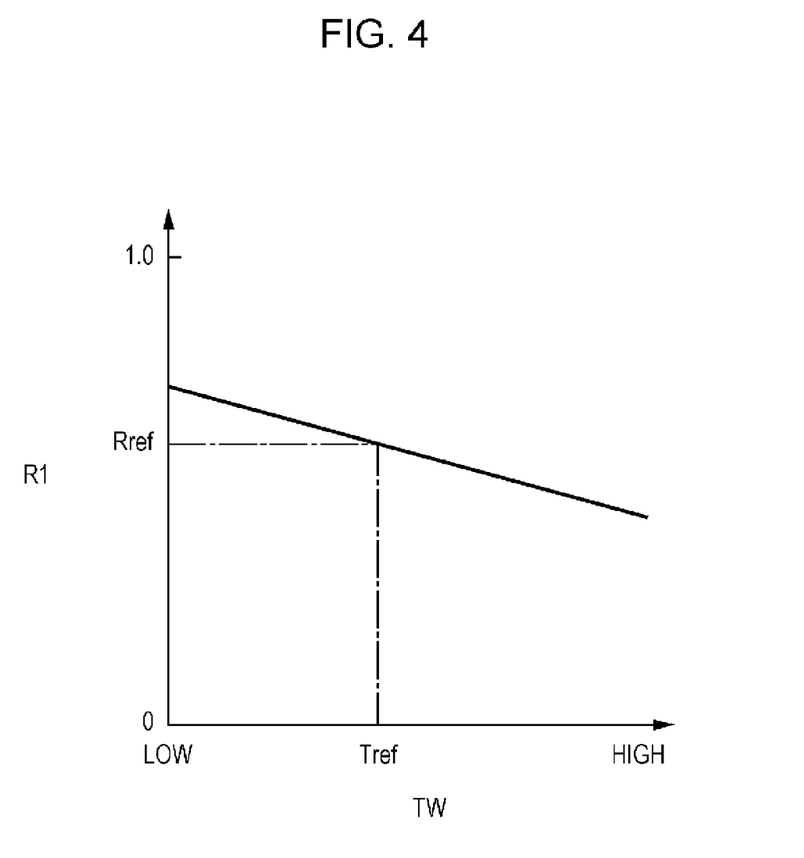
FIG. 4 illustrates an example of a map used for calculating the intake division ratio R1.

The intake division ratio R1 is the ratio of the amount of fuel to be first injected during the intake stroke in the combustion cycle to the total fuel injection amount TOUT. In this map, as shown in FIG. 4, the intake division ratio R1 is set to be a predetermined value Rref (e.g., 0.6) when the engine water temperature TW is a predetermined temperature Tref (e.g., 25° C.). The intake division ratio R1 is set to be greater as the engine water temperature TW is lower. The reason for this is to compensate for the generation of smoke. More specifically, when fuel injection is performed in the compression stroke during the warm-up operation for the engine 3, the amount of smoke to be generated may be increased as the engine water temperature TW is lower.

Then, the process proceeds to step S5 in which the product R1·TOUT of the intake division ratio R1 and the total fuel injection amount TOUT is set as the injection amount TOUT_in1 of the first injection operation in the intake stroke (hereinafter referred to as the "intake first injection amount TOUT_in1"). Then, in step S6, the intake second injection amount TOUT_in2 is set to be 0.

Then, in step S7, the value (1−R1)·TOUT is set as the fuel injection amount TOUT_cmp for the compression stroke (hereinafter referred to as the "compression fuel injection amount TOUT_cmp").

In contrast, if the result of step S3 is NO, it means that the catalyst temperature-raising control processing is not being performed. The process then proceeds to step S8 in which a predetermined value Rconst (e.g., 0.5) is set as the intake division ratio R1. The process then proceeds to step S9 in which the product R1·TOUT of the intake division ratio R1 and the total fuel injection amount TOUT is set as the intake first injection amount TOUT_in1.

In step S10, the value (1−R1)·TOUT is set as the intake second injection amount TOUT_in2. Then, the process proceeds to step S11 in which the compression fuel injection amount TOUT_cmp is set to be 0.

In step S12 after step S7 or S11, the injection timing is calculated on the basis of the three injection amounts TOUT_in1, TOUT_in2, and TOUT_comp, and the engine speed NE. The processing is then completed. Accordingly, when the catalyst temperature-raising control flag F_FIRE is 1, i.e., when the catalyst temperature-raising control processing is being performed, the above-described intake first injection amount TOUT_in1 of fuel is injected in the intake stroke, and the above-described compression fuel injection amount TOUT_cmp of fuel is injected in the compression stroke. In contrast, when the catalyst temperature-raising control processing is not being performed, the above-described intake first injection amount TOUT_in1 of fuel and the intake second injection amount TOUT_in2 of fuel are injected separately in the intake stroke.

As described above, in the fuel injection control apparatus 1, in the catalyst temperature-raising determination processing in step S1, if the results of steps S26 and S27 are YES, it means that the engine water temperature TW is lower than the predetermined warm-up temperature and that the idling operation is being performed, i.e., the engine 3 is in the warm-up operating state. Thus, the catalyst temperature-raising control flag F_FIRE is set to be "1". If either of the result of step S26 or S27 (or both the results of steps S26 and S27) is NO, the catalyst temperature-raising control flag F_FIRE is set to be "0". With this operation, when the engine 3 is in the warm-up operating state, fuel injection is performed twice in the intake stroke and in the compression stroke. Accordingly, compared with a known internal combustion engine in which fuel injection is performed twice separately in the intake stroke, the spark timing of fuel to be injected in the compression stroke is delayed, and thus, afterburning is encouraged, thereby increasing the temperature of an exhaust gas supplied to the catalyst 11. As a result, during the warm-up operation for the engine 3, the catalyst 11 can be more speedily activated, thereby improving emission characteristics.

As described above, when fuel injection is performed in the intake stroke and in the compression stroke separately, the catalyst 11 can be more speedily activated as the amount of fuel to be injected in the compression stroke becomes larger. On the other hand, the generation of smoke may be increased. To deal with this tradeoff relationship, in the fuel injection control apparatus 1 of this embodiment, when fuel injection is performed in the intake stroke and in the compression stroke separately, the intake division ratio R1 is set in accordance with the engine water temperature TW. That is, the ratio of the intake first injection amount TOUT_in1 to the compression injection amount TOUT_cmp is set in accordance with the engine water temperature TW. Thus, the speedy activation of the catalyst 11 and the suppression of smoke can be implemented in a well balanced manner.

If the result of either of step S26 or S27 is NO, it means that the engine 3 is not in the warm-up operating state. Accordingly, fuel injection is performed twice separately in the intake stroke. Thus, even if a large amount of fuel penetrates into the combustion chamber, the amount of fuel adhering to the wall of the combustion chamber can be reduced, compared with an engine in which fuel injection is performed only once in the intake stroke, thereby improving the atomization degree of fuel. As a result, a high level of combustion state can be obtained, and the HC density in the exhaust gas can be reduced, thereby improving emission characteristics.

In the above-described embodiment, a gasoline engine is used as the internal combustion engine. However, another type of engine may be used as long as fuel injection into a cylinder can be performed twice by the first injection operation and the second injection operation during one combustion cycle. For example, an internal combustion engine using diesel oil or natural gas as fuel may be used.

In the above-described embodiment, the present invention is applied to an internal combustion engine installed in a vehicle. However, the present invention is not restricted to this, and may be applied to an internal combustion engine installed in a ship or to other industrial internal combustion engines.

In the above-described embodiment, the engine water temperature TW is used as the engine temperature. However, any temperature representing the internal combustion engine may be used. For example, the temperature of lubricating oil used in the internal combustion engine may be used as the engine temperature.

In the above-described embodiment, the intake division ratio R1 is set in accordance with the engine water temperature TW. However, the intake division ratio R1 may also be set in accordance with another parameter, as well as in accordance with the engine water temperature TW.

According to the embodiment of the present invention, there is provided a fuel injection control apparatus for an internal combustion engine, in which an exhaust gas in an exhaust passage is purged by using a catalyst and fuel injection into a cylinder is performed by a first injection operation and a second injection operation separately during one combustion cycle, the first injection operation being followed by the second injection operation. The fuel injection control apparatus includes: a first injection controller (ECU 2, steps S4 to S7 and S12) that performs the first injection operation in an intake stroke and performs the second injection operation in a compression stroke; a second injection controller (ECU 2, steps S8 to S12) that performs both the first injection operation and the second injection operation in the intake stroke; and a selector (ECU 2, step S3) that selects fuel injection by using the first injection controller when the internal combustion engine is in a warm-up operating state and that selects fuel injection by using the second injection controller when the internal combustion engine is not in the warm-up operating state.

In this fuel injection control apparatus, when the internal combustion engine is in the warm-up operating state, fuel injection by using the first injection controller is selected. Accordingly, the first injection operation is performed in the intake stroke, and the second injection operation is performed in the compression stroke. Accordingly, compared with a known internal combustion engine in which fuel injection is performed twice in the intake stroke, the spark timing of fuel to be injected in the second injection operation is delayed, and thus, afterburning is encouraged, thereby increasing the temperature of an exhaust gas supplied to the catalyst. As a result, during the warm-up operation for the internal combustion engine, the catalyst can be more speedily activated, thereby improving emission characteristics. When the internal combustion engine is not in the warm-up operating state, fuel injection by using the second injection controller is selected. Accordingly, both the first and second injection operations are performed in the intake stroke. Thus, even if a large amount of fuel penetrates into the combustion chamber, the amount of fuel adhering to the wall of the combustion chamber can be reduced, compared with an engine in which fuel injection is performed only once in the intake stroke, thereby improving the atomization degree of fuel. As a result, a high level of combustion state can be obtained, and the HC density in the exhaust gas can be reduced, thereby improving emission characteristics.

The above-described fuel injection control apparatus may further include an engine temperature detector that detects an engine temperature as a temperature of the internal combustion engine. The first injection controller may determine the ratio of an amount of fuel to be injected in the first injection operation to an amount of fuel to be injected in the second injection operation in accordance with the engine temperature detected by the engine temperature detector.

Generally, when fuel injection is performed in the intake stroke and in the compression stroke separately, the catalyst can be more speedily activated as the amount of fuel to be injected in the compression stroke becomes larger. On the other hand, the generation of smoke may be increased. To deal with this tradeoff relationship, in this fuel injection control apparatus, when the internal combustion engine is in the warm-up operating state, the ratio of an amount of fuel to be injected in the first injection operation to that in the second injection operation is determined in accordance with the detected engine temperature. Thus, the speedy activation of the catalyst and the suppression of smoke can be implemented in a well balanced manner.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control apparatus for an internal combustion engine in which an exhaust gas in an exhaust passage is purged using a catalyst, the fuel injection control apparatus comprising:
   a first injection controller configured to perform a first injection operation in an intake stroke and configured to perform a second injection operation in a compression stroke, fuel injection into a cylinder being performed by the first injection operation and the second injection operation separately during one combustion cycle in the internal combustion engine, the first injection operation being followed by the second injection operation;
   a second injection controller configured to perform both the first injection operation and the second injection operation in the intake stroke and no injection operation in the compression stroke; and
   a selector configured to select fuel injection performed by the first injection controller when the internal combustion engine is in a warm-up operating state and an idling operating state and configured to select fuel injection performed by the second injection controller when the internal combustion engine is not in at least one of the warm-up operating state and the idling operating state,
   wherein, when fuel injection performed by the first injection controller is selected, the selector switches fuel injection to fuel injection performed by the second injection controller from fuel injection performed by the first injection controller when an operating state of the internal combustion engine changes out of the idling operating state even if the internal combustion engine has an engine temperature that is lower than a predetermined warm-up temperature, and wherein, at all times before the warm-up has been finished, fuel injection is switched from fuel injection performed by the first injection controller to fuel injection performed by the second injection controller when an operating state of the internal combustion engine changes out of the idling operating state.

2. The fuel injection control apparatus for an internal combustion engine, according to claim 1, further comprising:

an engine temperature detector configured to detect the engine temperature as a temperature of the internal combustion engine, wherein the first injection controller is configured to determine a ratio of an amount of fuel to be injected in the first injection operation to an amount of fuel to be injected in the second injection operation in accordance with the engine temperature detected by the engine temperature detector, wherein, when the engine temperature is equal to a predetermined temperature, the first injection controller determines the ratio so that an amount of fuel to be injected in the first injection operation is larger than an amount of fuel to be injected in the second injection operation, and wherein, when the engine temperature is lower than the predetermined temperature, the first injection controller determines the ratio so that an amount of fuel to be injected in the first injection operation is larger than an amount of fuel to be injected in the second injection operation and so that the lower the engine temperature is, the larger the difference between an amount of fuel to be injected in the first injection operation and an amount of fuel to be injected in the second injection operation.

3. A method for controlling an internal combustion engine in which an exhaust gas in an exhaust passage is purged using a catalyst, the method comprising:

performing a first injection operation in an intake stroke and performing a second injection operation in a compression stroke by a first injection controller, fuel injection into a cylinder being performed by the first injection operation and the second injection operation separately during one combustion cycle in the internal combustion engine, the first injection operation being followed by the second injection operation;

performing both the first injection operation and the second injection operation in the intake stroke and no injection operation in the compression stroke by a second injection controller;

selecting fuel injection performed by the first injection controller when the internal combustion engine is in a warm-up operating state and an idling operating state; and selecting fuel injection performed by the second injection controller when the internal combustion engine is not in at least one of the warm-up operating state and the idling operating state, wherein, when fuel injection performed by the first injection controller is selected, the selector switches fuel injection to fuel injection performed by the second injection controller from fuel injection performed by the first injection controller when an operating state of the internal combustion engine changes out of the idling operating state even if the internal combustion engine has an engine temperature that is lower than a predetermined warm-up temperature, and wherein, at all times before the warm-up has been finished, fuel injection is switched from fuel injection performed by the first injection controller to fuel injection performed by the second injection controller when an operating state of the internal combustion engine changes out of the idling operating state.

4. The method according to claim 3, further comprising:

detecting the engine temperature as a temperature of the internal combustion engine by an engine temperature detector; and determining a ratio of an amount of fuel to be injected in the first injection operation to an amount of fuel to be injected in the second injection operation in accordance with the engine temperature detected by the engine temperature detector, wherein, when the engine temperature is equal to a predetermined temperature, the first injection controller determines the ratio so that an amount of fuel to be injected in the first injection operation is larger than an amount of fuel to be injected in the second injection operation, and wherein, when the engine temperature is lower than the predetermined temperature, the first injection controller determines the ratio so that an amount of fuel to be injected in the first injection operation is larger than an amount of fuel to be injected in the second injection operation and so that the lower the engine temperature is, the larger the difference between an amount of fuel to be injected in the first injection operation and an amount of fuel to be injected in the second injection operation.

* * * * *